United States Patent [19]

Meguro

[11] Patent Number: 4,739,432

[45] Date of Patent: Apr. 19, 1988

[54] LID ASSEMBLY FOR MAGNETIC TAPE CASSETTE

[75] Inventor: Hiroshi Meguro, Miyagi, Japan

[73] Assignee: Sony Corporation, Tokyo, Japan

[21] Appl. No.: 99,658

[22] Filed: Sep. 21, 1987

Related U.S. Application Data

[63] Continuation of Ser. No. 717,806, Mar. 29, 1985, abandoned.

[30] Foreign Application Priority Data

Apr. 10, 1984 [JP] Japan .................. 59-52373[U]

[51] Int. Cl.⁴ .................. G11B 15/32; G11B 23/04; G11B 1/04
[52] U.S. Cl. .................. 360/132; 360/95; 360/137; 242/198
[58] Field of Search .................. 360/132, 137, 85, 95; 242/197–199

[56] References Cited

U.S. PATENT DOCUMENTS

| | | | |
|---|---|---|---|
| 3,900,172 | 8/1975 | Kamaya | 242/198 |
| 4,419,708 | 12/1983 | Ogiro et al. | 360/132 X |
| 4,422,599 | 12/1983 | Okamura et al. | 242/198 |
| 4,428,548 | 1/1984 | Gotoh | 242/199 |
| 4,572,461 | 2/1986 | Horikawa et al. | 360/132 |
| 4,589,609 | 5/1986 | Oishi et al. | 360/132 |

FOREIGN PATENT DOCUMENTS

| | | | |
|---|---|---|---|
| 0125688 | 11/1984 | European Pat. Off. | 360/132 |
| 55-42385 | 3/1980 | Japan | 360/132 |

Primary Examiner—John H. Wolff
Assistant Examiner—Alfonso Garcia
Attorney, Agent, or Firm—Hill, Van Santen, Steadman & Simpson

[57] ABSTRACT

A magnetic tape cassette having an upper half, a lower half and a front lid with a front plate and first and second side plates with first and second bearing shafts extending from the side walls, and the upper half formed with bearing means for receiving the first and second shafts which have guiding ramps which are continuously formed and which continue into a circular opening formation of fixed radius of greater than 180 degrees and which provide self-centering and self-aligning for the shafts.

2 Claims, 5 Drawing Sheets

LID ASSEMBLY FOR MAGNETIC TAPE CASSETTE

This is a continuation of application Ser. No. 717,806, filed Mar. 29, 1985, now abandoned.

BACKGROUND OF THE INVENTION

1. Field of the Invention

This invention relates generally to magnetic tape cassettes and more particularly to a magnetic tape cassette suitable for use for recording a digital signal, for example, a PCM (pulse code modulated) signal.

2. Description of the Prior Art

At present, a PCM recording and reproducing apparatus is proposed in which an analog signal such as an audio signal or the like is converted into a digital signal, for example, a PCM signal and then recorded on (or reproduced from) a magnetic tape. In the known PCM recording and reproducing apparatus there is known such one which uses a rotary head to afford a relatively high recording density.

In such PCM recording and reproducing apparatus having the rotary head, upon recording or reproducing, a magnetic tape is pulled out of the tape cassette, wound around the rotary drum in which the rotary head is provided, and then the recording or reproducing is carried out.

In the tape cassette accomodating therein such magnetic tape, if oil component such as fingerprints or the like and dusts adhere to the magnetic tape, a dropout is caused in the reproduced signal. So, in order to prevent the oil component such as fingerprints or the like and dusts from adhering to the magnetic tape, the magnetic tape has to be held in a closed state as tightly as possible. Further, the tape cassette must provide at its front portion a space through which a tape guide system is inserted into the tape cassette for drawing out the magnetic tape from the tape cassette upon recording or reproducing.

To this end, there is proposed such a tape cassette in which its front side at which the magnetic tape is exposed is closed by a front lid in accordance with the rotation thereof as shown in FIGS. 1 and 2. In FIGS. 1 and 2, reference numeral 1 generally designates a cassette housing and this cassette housing 1 comprises a pair of upper half 2 and lower half 3 which are fastened integral by screw bolts (not shown). Reference numeral 2a designates a transparent window plate provided on the upper surface of the upper half 2.

Reference numerals 4a and 4b respectively designate a pair of reel hubs incorporated into the cassette housing 1 and which are rotatably engaged with a pair of reel shaft insertion apertures 5a and 5b which are formed through the lower half 3 at its predetermined positions. A magnetic tape 6 is wound around the pair of reel hubs 4a and 4b.

Reference numeral 7 designates a front lid which is rotatably pivoted to the cassette housing 1 at its front surface side and near right and left side wall portions of the cassette housing 1. When this front lid 7 is rotated upwards from the front surface side of the tape cassette, the magnetic tape 6 is exposed at the front portion of the tape cassette. Reference numeral 3a designates a cut-out portion of rectangular shape formed through the bottom surface of the lower half 3 at the position near the end portion of the front portion of the tape cassette. Upon use, the tape guide system (not shown) is inserted into the cut-out portion 3a for drawing out the magnetic tape 6 from the tape cassette.

Reference numeral 8 designates a sliding member or slider of nearly U-shape which is provided such that it can be slidably moved back and forth in opposing relation to the lower surface and the right and left side wall portions of the lower half 3.

In such tape cassette, upon use, as shown in FIG. 2, the front lid 7 is rotated upwards from the front side of the tape cassette and the slider 8 is slid backward to thereby expose the magnetic tape 6 at the front portion of the tape cassette. Thereafter, the tape guide system is inserted into the cut-out portion 3a and the magnetic tape 6 is pulled out of the cassette housing 1 by this tape guide system and then loaded onto the rotary drum, whereby to carry out the predetermined recording or reproducing. After the recording or reproducing is ended and the tape cassette is set in its non-use mode, the reverse operation to the above-described operation is carried out.

In the tape cassette with the rotatable front lid 7, in order to mount the front lid 7 rotatably on the cassette housing 1, it is necessary that, as shown in FIG. 3, a bearing upper portion 10 formed on the upper half 2 at its side portion and near the front opening portion of the tape cassette and a bearing lower portion 11 formed on the lower half 3 at its side portion and near the front opening portion of the cassette are employed to constitute a bearing portion which rotatably supports therein a shaft 12 which protrudes inside of each of the side portions of the front lid 7 when the upper half 2 and the lower half 3 are fastened together.

In other words, the shaft 12 is rotatably supported in the bearing portion formed of the bearing upper portion 10 of the upper half 2 shown by a solid line and the bearing lower portion 11 shown by a one-dot chain line in FIG. 3. In this case, the shaft 12 of the front lid 7 is provided with a twist coil spring 13 which biases the portion formed through the front portion of the cassette housing 1.

When the tape cassette constructed as mentioned above is manufactured, the slider 8 must be slidably mounted on the lower half 3 and the rotary shaft 12 of the front lid 7 must be held between the bearing upper portion 10 of the upper half 2 and the bearing lower portion 11 of the lower half 3. In this case, since the front lid 7 can not temporarily be mounted on the upper half 2, there are defects that the assembling work of the tape cassette is difficult and that the number of the assembling works is inevitably increased.

OBJECTS AND SUMMARY OF THE INVENTION

It is an object of this invention is provide an improved magnetic tape cassette with a rotatable lid.

It is another object of this invention to provide a magnetic tape cassette in which a front lid can temporarily be mounted on an upper half of a cassette housing.

It is a further object of this invention to provide a magnetic tape cassette capable of facilitating the manufacturing and assembling of the magnetic tape cassette and which can decrease the number of the assembling work processes.

According to an aspect of this invention, there is provided a magnetic tape cassette including an upper half, a lower half and a front lid which is formed of a front plate, side plates provided at both side portions of said front plate and a pair of shafts respectively provided on the insides of said side plates, comprising:

bearing means having a bearing aperture with a shape of a circular arc larger than a semicircle and formed on said side plate portion of said upper half, wherein said front lid can temporarily be mounted on said upper half by inserting said rotary shafts of said front lid into said bearing means of said upper half.

These and other objects, features and advantages of the magnetic tape cassette according to the present invention will become apparent from the following detailed description of the preferred embodiment taken in conjunction with the accompanying drawings, throughout which like reference numerals designate like elements and parts.

DESCRIPTION OF THE PREFERRED EMBODIMENT

Figure 1:
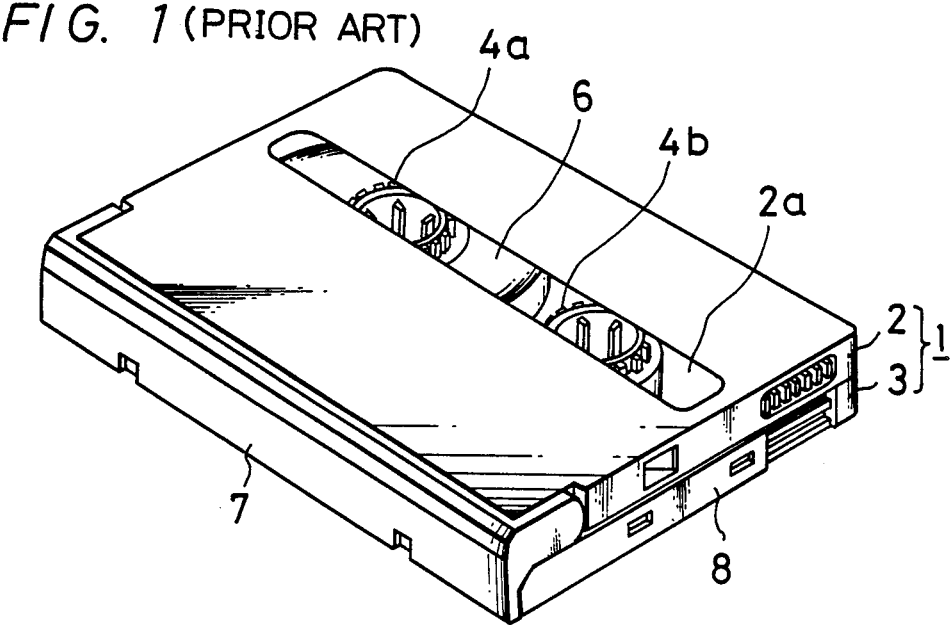
FIG. 1 is a perspective view illustrating an example of a prior art tape cassette.
Figure 2:
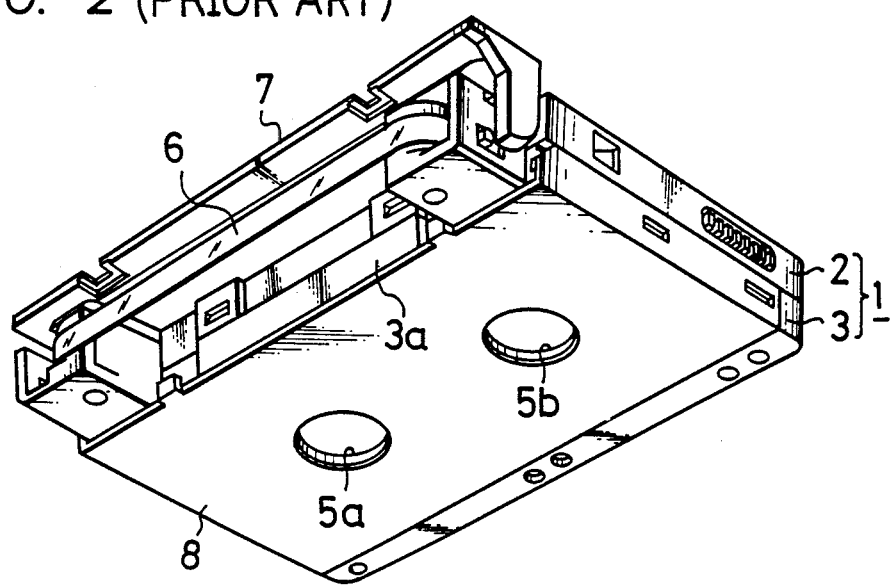
FIG. 2 is a perspective view illustrating the tape cassette of FIG. 1 when it is used.
Figure 3:
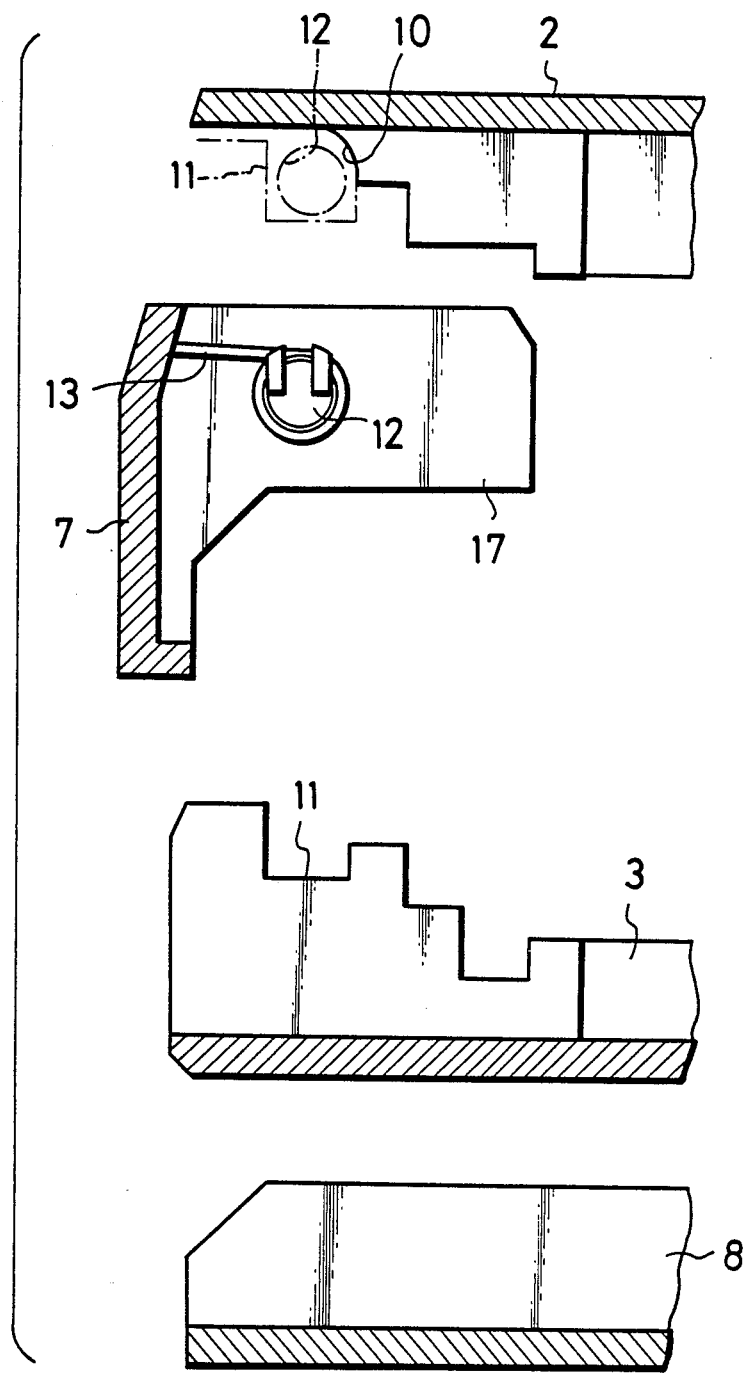
FIG. 3 is an exploded side view of a main part of the tape cassette of FIG. 1.

Now, an embodiment of the tape cassette according to this invention will hereinafter be described with reference to FIGS. 4 to 9. In FIGS. 4 to 9, like parts corresponding to those of FIGS. 1 to 3 are marked with the same references and will not be described in detail.

Figure 4:
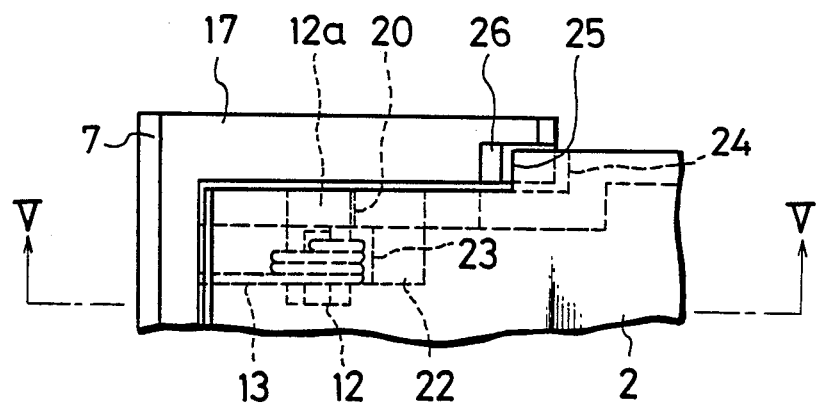
FIG. 4 is a plan view illustrating a main part of an embodiment of the tape cassette according to this invention.
Figure 5:
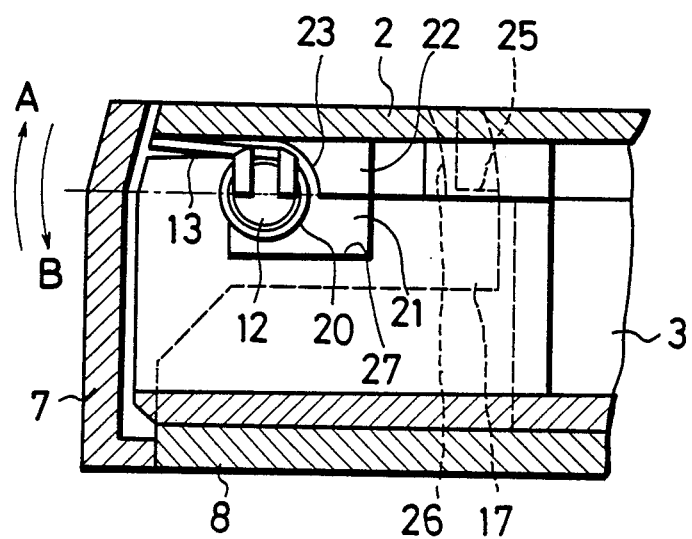
FIG. 5 is a cross-sectional view taken along the line V—V of FIG. 4.

FIG. 4 is a plan view illustrating a main part of the cassette housing 1 to which the front lid 7 is rotatably attached and FIG. 5 is a cross-sectional view taken along the like V—V in FIG. 4. From an exploded side view of FIG. 6, it will be seen that this main part of the cassette housing 1 is formed of the upper half 2, the front lid 7, the lower half 3 and the slider 8.

Figure 6:
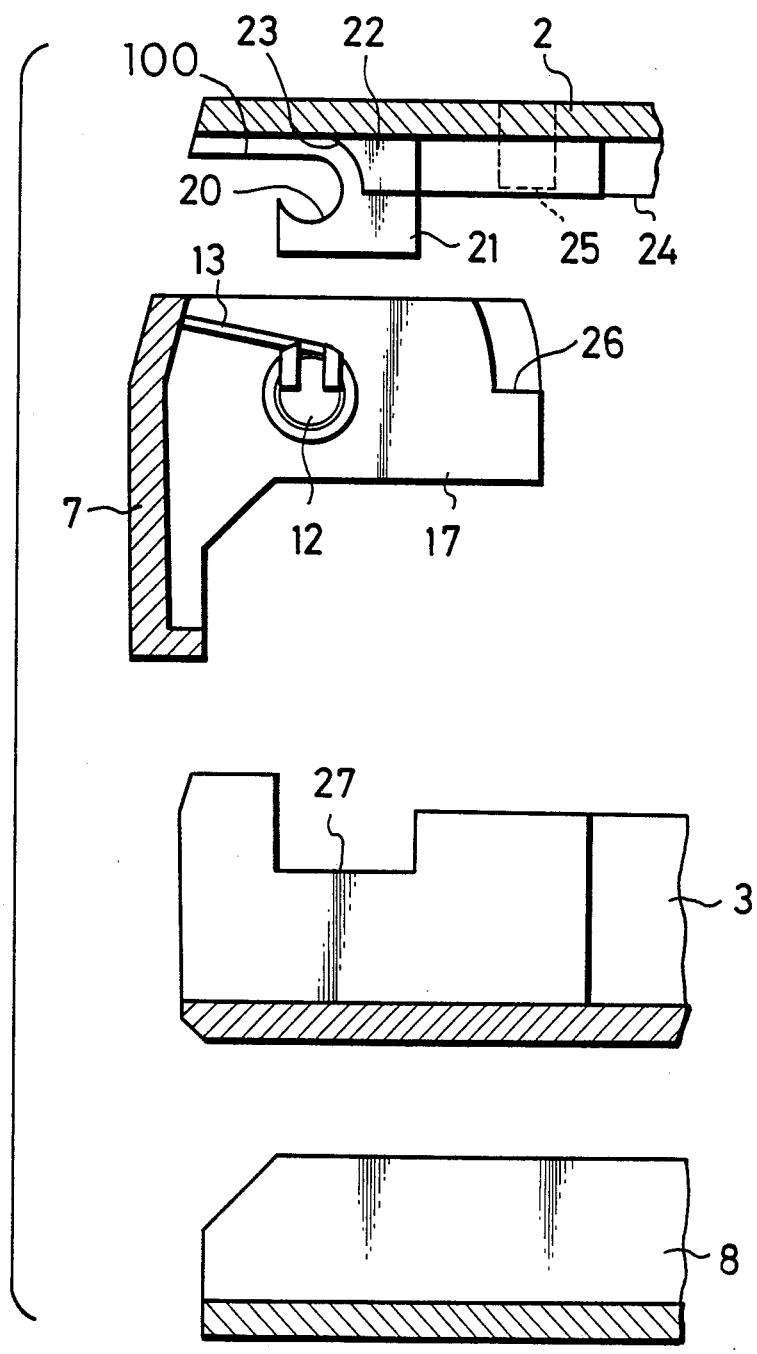
FIG. 6 is an exploded side view illustrating a main part of the tape cassette of FIG. 4.
Figure 7:
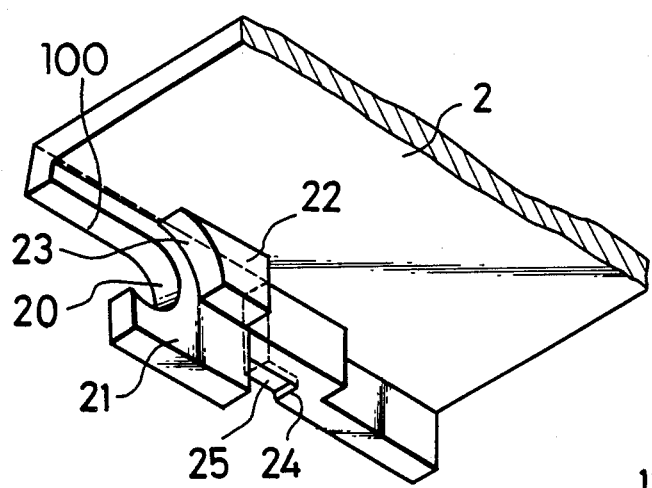
FIG. 7 is a perspective view of a main part of the upper half of the tape cassette of FIG. 4.
Figure 8:
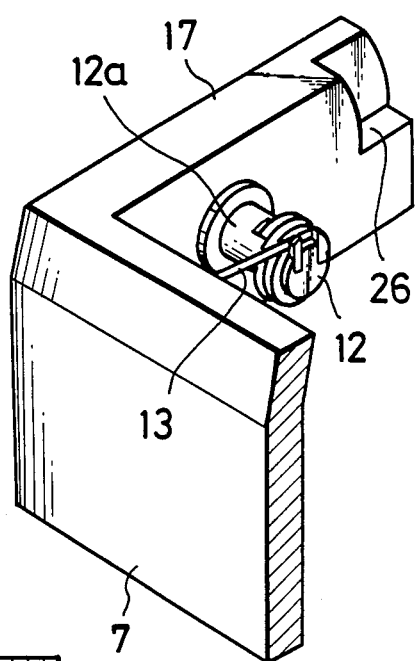
FIG. 8 is a perspective view of a main part of the front lid thereof.

At each of the both side portions of the upper half 2 near the front opening thereof, there is formed a bearing portion or aperture 20 which has a circular formation of fixed radios and exceeds 180 degrees and is open on the front side and joins a guide ramp 100 as shown in FIGS. 6 and 7. On a front portion of a base portion 22 protruded inwardly from a rectangular side plate 21 with the bearing portion 20 formed therein there is formed a spring pushing surface 23 formed with a circular arc larger than that of the bearing portion 20 and which is concentric with the bearing portion 20.

From a stepped portion 24 formed on the upper half 2 at its retreated portion and on its outer surface so as to rotatably attach the front lid 7 to the cassette housing 1, there is continuously formed a rectangular parallelpiped receiving protruded portion 25. Further, on each of side portions 17 of the front lid 7 provided with the shaft 12, there is formed a cut-out engaging portion 26 which takes the form of a part of a circular arc in the upper position of the inside surface of the free end portion of the side portion 17.

As shown in FIG. 6, on the side portion of the lower half 3 and near the front opening thereof, there is formed a rectangular concave portion 27 corresponding in shape to the rectangular side plate 21 in which the bearing portion 20 is provided so as to be engaged with the side plate 21. Accordingly, when, for example, as shown in FIG. 5, the upper half 2 and the lower half 3 are fastened together, in the both sides of the front opening of the cassette housing 1, the rectangular side plates 21 and 21 are respectively engaged with the rectangular concave portions 27 and 27 with the result that the lateral opening of the bearing portions 20 (shown opening toward the left in the embodiment illustrated in FIG. 6); are closed and that the shafts 12 are rotatably received into the bearing portions 20. The ramps 100 provide self-centering and self-aligning for the shafts.

When the front lid 7 is rotatably mounted to the upper half 2 constructed as mentioned above, a circular shaft portion 12a, the outer diameter of which is selected larger than the laterally facing opening of the aperture 20, of the shaft 12 of the front lid 7 is moved into the bearing portion 20 while the rectangular side plate 21 is being deformed due to its flexibility.

Figure 9:
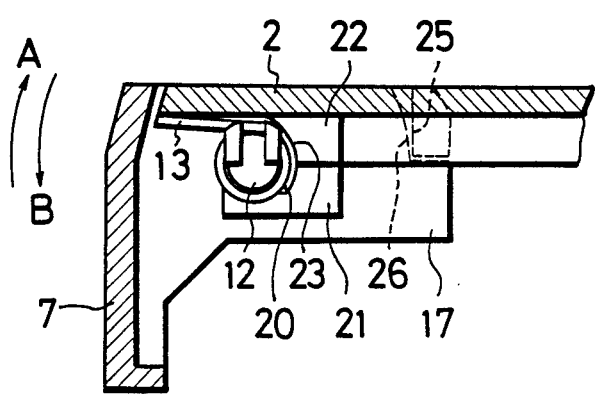
FIG. 9 is a cross-sectial side view of a main part of the tape cassette of FIG. 4 in which the front lid is rotatably mounted to the upper half.

Under this state, each shaft 12 of the front lid 7 is moved into each bearing portion 20 of the upper half 2 and the cut-out engaging portion 26 of the front lid 7 is engaged with the receiving protruded portion 25 of the upper half 2, whereby to temporarily mount the front lid 7 to the upper half 2 such that the front lid 7 can be rotated in the direction shown by an arrow A so as to be opened but is prevented from being rotated in the direction shown by an arrow B in FIG. 9. Consequently, upon assembling of the tape cassette, the upper half 2 and the front lid 7 can be handled as a unitary assembly part and thence the manufacturing and assembly is simple. That is, while a combination of the upper half 2 and the front lid 7 as shown in Fig. 9 is used as an upper assembly component and a combination of the lower half 3 and the slider 8 is used as a lower assembly component, the upper assembly component and the lower assembly component can be combined integrally upon manufacturing as shown in FIGS. 4 and 5, thus the tape cassette of this invention can be easily mass produced.

As compared with the manufacturing of the prior art tape cassette in which the upper half 2, the front lid 7, the lower half 3 and the slider 8 are separately assembled, the tape cassette of this invention can decrease the number of the manufacturing work processes.

Further, since the shaft 12 of the front lid 7 is mainly supported by the bearing portion 20, the influence of the joint between the upper half 2 and the lower half 3 on the rotation of the front lid 17 is so small that the shaft 12 of the front lid 7 can be smoothly supported by the bearing portion 20.

As set forth above, according to the magnetic tape cassette of the present invention, since the front lid 7 can temporarily be mounted to the upper half 2, upon manufacturing and assembling the tape cassette, the manufacturing and assembly is easy and the number of assembly steps is small.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

I claim as my invention:

1. A magnetic tape cassette comprising an upper half, a lower half, a front lid formed with a front plate and first and second side plates with one or either side of said front lid, first and second bearing shafts extending from said first and second side plates of said front lid, said upper half formed with first and second bearing means and each having guiding ramps which are continuously formed and which continue into a circular opening formation of fixed radius and which exceeds 180 degrees, said first and second shafts are receivable into said first and second bearing means and said shafts have a diameter which is greater than the distance from said ramp to the free end of said opening of said bearing means and said first and second shafts are moveable along said first and second ramps into said bearing means and said ramps provide self-centering and self-aligning for minimizing the assembly time.

2. A magnetic tape cassette as claimed in claim 1, in which said upper half has a side rear portion of said bearing means which has a protruded portion and said protruded portion is respectively engaged with a rear portion of said side plates of said front lid, so as to position said front lid.

* * * * *